(12) United States Patent
Goss et al.

(10) Patent No.: US 8,988,319 B2
(45) Date of Patent: Mar. 24, 2015

(54) DISPLAY DEVICE FOR A VEHICLE AND METHOD FOR DISPLAYING DATA

(75) Inventors: Stefan Goss, Hildesheim (DE); Stefan Lux, Meine (DE); Robert Hofmann, Berlin (DE); Rainer Dehmann, Berlin (DE); Kyoung Sun Han, Berlin (DE); André Haedicke, Halle/Saale (DE); Heino Wengelnik, Wolfsburg (DE); Lorenz Bohrer, Berlin (DE); Joerg Lilienthal, Gifhorn (DE); Will Specks, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 1524 days.

(21) Appl. No.: 11/632,095

(22) PCT Filed: Jun. 15, 2005

(86) PCT No.: PCT/EP2005/006399
§ 371 (c)(1),
(2), (4) Date: Nov. 13, 2007

(87) PCT Pub. No.: WO2006/005407
PCT Pub. Date: Jan. 19, 2006

(65) Prior Publication Data
US 2008/0068399 A1    Mar. 20, 2008

(30) Foreign Application Priority Data

Jul. 9, 2004  (DE) .......................... 10 2004 033 678
Nov. 19, 2004 (DE) .......................... 10 2004 055 835

(51) Int. Cl.
*G09G 3/04*    (2006.01)
*B60Q 1/00*    (2006.01)
(Continued)

(52) U.S. Cl.
CPC ................. *B60K 35/00* (2013.01); *B60K 37/02* (2013.01); *B60K 2350/1072* (2013.01); *B60K 2350/2095* (2013.01); *B60K 2350/1068* (2013.01)
USPC ............................... 345/40; 340/438; 345/56

(58) Field of Classification Search
CPC ............. G06F 3/14; G06F 3/48; G06F 17/30; G06F 2212/173; G06F 1/1347; G02B 23/10; G02B 27/10; G09G 5/00; G09G 5/08; B60Q 1/10; B60Q 3/00; B60Q 3/04
USPC .......................................................... 345/40
See application file for complete search history.

(56) References Cited

U.S. PATENT DOCUMENTS 4,509,043 A * 4/1985 Mossaides .................... 345/634
4,818,048 A   4/1989 Moss
(Continued)

FOREIGN PATENT DOCUMENTS

DE   197 32 156   1/1998
DE   199 44 067   3/2001
(Continued)

OTHER PUBLICATIONS

International Search Report, PCT International Patent Application No. PCT/EP2005/006399, dated Sep. 5, 2005.
Written Opinion of the International Searching Authority, PCT International Patent Application No. PCT/EP2005/006399, dated Sep. 5, 2005 (translation provided).

*Primary Examiner* — Kenneth Bukowski
(74) *Attorney, Agent, or Firm* — Kenyon & Kenyon LLP

(57) ABSTRACT

A display device includes at least one processing device and at least one display element for representing at least two image planes that are able to be combined with each other, and a method is for representing a plurality of combinable image planes for displaying data.

36 Claims, 2 Drawing Sheets

(51) Int. Cl.
   *B60K 35/00*   (2006.01)
   *B60K 37/02*   (2006.01)

(56) References Cited

U.S. PATENT DOCUMENTS

| | | | |
|---|---|---|---|
| 4,951,229 | A | 8/1990 | DiNicola et al. |
| 5,361,165 | A * | 11/1994 | Stringfellow et al. ........ 359/631 |
| 6,181,301 | B1 | 1/2001 | Inoguchi et al. |
| 6,215,490 | B1 * | 4/2001 | Kaply ........................... 715/788 |
| 6,369,830 | B1 * | 4/2002 | Brunner et al. ............... 345/629 |
| 6,411,216 | B1 | 6/2002 | Fukushima et al. |
| 6,624,749 | B1 | 9/2003 | Winterkorn |
| 6,654,024 | B1 | 11/2003 | Volkel |
| 7,496,446 | B2 * | 2/2009 | Maruyama et al. ........... 701/436 |
| 2001/0040534 | A1 * | 11/2001 | Ohkawara et al. ................. 345/7 |
| 2003/0229441 | A1 * | 12/2003 | Pechatnikov et al. ......... 701/201 |

FOREIGN PATENT DOCUMENTS

| | | |
|---|---|---|
| EP | 0 352 012 | 1/1990 |
| EP | 0 454 423 | 10/1991 |
| EP | 0 701 926 | 3/1996 |
| EP | 1 055 543 | 11/2000 |
| EP | 1 067 502 | 1/2001 |
| JP | 7-261677 | 10/1995 |
| JP | 8-332873 | 12/1996 |
| JP | 9-318395 | 12/1997 |
| JP | 11-227496 | 8/1999 |
| JP | 11-311545 * | 11/1999 |
| JP | 2002-287668 | 10/2002 |
| WO | WO 01/15132 * | 3/2001 |

* cited by examiner

DISPLAY DEVICE FOR A VEHICLE AND METHOD FOR DISPLAYING DATA

FIELD OF THE INVENTION

The present invention relates to a display device, e.g., for motor vehicles, in which at least two image planes are able to be displayed and/or are displayed to the viewer, one after the other, as well as a method for displaying data on a display device, e.g., of a motor vehicle, using at least two image planes that are able to be displayed and/or are displayed to the viewer, one behind the other.

BACKGROUND INFORMATION

Because of the multitude of different electronic devices and applications in vehicles, such as navigation devices, driver assistance systems such as adaptive cruise control, AUDIO and entertainment systems, multifunctional operating devices are provided in many vehicles, with the aid of which these units and applications are able to be operated via one or more menu structures.

One method for reducing the computing power and storage resources required for displaying a graphics system constructed of a plurality of image planes is described in European Published Patent Application No. 0 352 012. So-called priorities are assigned to individual image points, in this context, only the image points having the highest priority being displayed. If the image of one plane is only of a small moving object, then, for an image sequence, only the image points referring to the moving object have to be newly calculated.

A multifunctional operating device is described in European Published Patent Application No. 0 701 926, which has a display device for displaying the dialed up menu planes, individual operating elements assigned to the individual device groups, devices or applications, as well as a multifunctional operating element for dialing up and selecting the functions individually assigned to them. The individual functions are displayed on one or a plurality of operating surfaces, the selected function being graphically highlighted. An enlarged display or optical correspondence are given as specific arrangements.

Furthermore, one may gather a display instrument, from European Published Patent Application No. 1 055 543, which is made up of several display elements which, at least partially, mutually overlap. The essential data for the operating conditions, such as warning signs, can be displayed on the display element situated closest to the viewer. The display elements are connected to the housing via a plug connection, and are thus able to be retrofitted or exchanged at a later time, without problem, in order to satisfy even individual requirements.

A method for displaying primary and secondary data for use especially in navigation devices is described in German Published Patent Application No. 199 44 067. The meaningfulness of the directions changes with advancing time and distance traveled. The instruction to turn off to the right at the next intersection is still rather less important at a distance of 2 km, whereas, at the latest at the time for setting the blinker signal, it is highly important. For the visual discrimination of display contents corresponding to their meaningfulness, the brightness or color of the displayed symbols is changed.

SUMMARY

Example embodiments of the present invention provide a display device for displaying a plurality of data and status messages. Example embodiments of the present invention provide a display device for a vehicle which has at least one processing device and at least one display element. At least two image planes having image elements are able to be generated with the aid of the processing unit. The image planes may be combined for display on the display element. This may provide that primary and secondary data are able to be shown at the same time in one display device, as a function of their priority. The simultaneous display of several image planes may take place, for example, in that primary data, that is, data of the highest priority, are shown in one display area of the display, and secondary data, that is, data of lower priority, are shown in the remaining display area.

Primary and secondary data are able to be combined to at least two display planes situated one behind the other, and are able to be output to at least one display device, the first display plane overlapping at least partially with the second display plane, and the sequence of the display planes is able to be changed individually, in a simple manner.

The area in which primary data are shown is, for instance, in the center of the display, while the secondary data are shown in the edge area of the display. However, other priority levels are possible too. Depending on the priority, different planes and displays are assigned to the data. If all the planes and displays are already exhausted, the possibility exists of not displaying data of the lowest priority. Then if, in the course of time, a plane or a display area becomes free, because other data of comparatively higher priority, that were displayed, have become superfluous, the data of the lowest priority are then able to be displayed.

Data can become superfluous if, for example, a direction of the navigation system to turn off at the next intersection has become invalid because the vehicle has already turned off, if a notice concerning a low windshield wiper water level has been acknowledged by the driver, if a message concerning an incoming call is no longer current because the caller has hung up or the driver has already accepted the call, or if some data are no longer displayed for another reason.

The establishment of the priorities of the individual notices or data is performed by the manufacturer, and is stored in the system. Thus, warning notices, such as warnings concerning clearance distances, receive a higher priority than instructions that currently track 3 of the CD lying in slot 5 of the CD player is being played. In addition, within a certain scope, the user may be given the possibility of establishing the priority sequence himself, and to save that in a user profile. Thus, if desired, the radio station that has been set and is audible via the loudspeaker may be given a higher priority than the selected program that is audible, for instance, via earphones of the rear seat entertainment by the passengers sitting in the rear seats, or vice versa.

The image planes may have areas that appear transparent in partial areas or over the whole area. Thus, the image areas that appear transparent in the image plane having the higher priorities unblock, in these areas, the view onto the image planes having comparatively low priority.

The transparent areas may not only appear to be completely transparent, but may also be partially or in a graded manner designed to be transparent. This may provide that an image element displayed at a higher priority does not completely bar the view onto an image element shown in the same display area and having comparatively lower priority. Thus, for instance, the currently displayed map section of a navigation application would continue to be visible if, in a partially transparent embodiment, a notice of higher priority were displayed, such as a warning notice on the oil pressure.

Data of different information content may be brought to display on the various image planes. Thus, for instance, the image plane having comparatively higher priority may be used for the display of dynamic image contents, such as the current speed being traveled, and important warning notices, whereas the data of the navigation system is displayed on an image plane having a medium priority assigned to it, and the AUDIO and entertainment data are displayed on the image plane having a comparatively low priority.

The different image planes may be displayed one behind the other. Thus, the image plane shown closest to the viewer, having the data of the comparatively highest priority, depending on its design, at least partially, and at least in partial areas, covers up data having subordinate rank shown in the image plane behind the one that is nearest, as seen by the viewer.

Data having partially different priorities may be displayed on different image planes. Thus, for instance, in one image plane the central image areas may be provided for data which have the highest priority on this image plane, whereas in the edge areas of the display the data having comparatively subordinate priority are shown. The relevant data for driver safety, such as current speed, thus are shown in the middle of the display, while a warning notice about a low level in the windshield washer liquid is shown in an edge area of the display. Moreover, it is possible to display indications of the highest priority always at the same place of the display area, whereas the positions of the displays of notices of subordinate rank may vary.

Notices, to the extent that several notices are present, may be displayed, at least partially staggered according to their priority, on the image plane facing the viewer most closely. A warning announcement, as a result of brakes that are not functioning perfectly, is accordingly shown to the viewer first, followed by a notice on oil pressure that is too low in the engine compartment and, for instance, information on a traffic jam at a distance of 10 km. If notices of comparatively low priority are faded out by data of higher priority, at least an indication may be displayed as to further announcements that are present. This may, in the first place, be achieved by an only partial fading out, or via additional image elements which give hints on what the data are.

Announcements may be displaced by the user into other image areas of a plane, or even ported over to other image planes, in order to make other data, that are also present, visible. This is required if the display area is already completely covered by displays of notices, but further notices are present which are also to be displayed. Thus, if there are announcements that the user has already registered, but which have not yet become invalid because, for example, the windshield wiper liquid has not yet been filled up, these announcements, counter to their actual priority, may be displaced to rear image planes, or may first be faded out, so that data that are additionally present may be displayed. For this, the user has to acknowledge the announcement, so that the system knows that the user has seen the announcement. Then, another announcement may be displayed at this location. Furthermore, it is possible to display several announcements in the same display area, by displaying the announcements alternatingly at time intervals to be determined.

Logically connected data may be displayed, staggered by their logical sequence, on various image planes. The data relevant first in their logical sequence are displayed in the image plane closest to the viewer. In the respectively succeeding image plane the respectively next data may be displayed according to the logical sequence. If a navigations system states, as next information for a route, that, after starting, one should leave the expressway after 15 km and should continue driving in the direction of Gifhorn, and at the same time the announcement about a traffic jam at a distance of 5 km is to be displayed, the logical sequence, and with that also the sequence of the displays, would be to begin with the information on the traffic jam, and then the announcement about leaving the expressway at a 10 km distance, and finally the superordinated direction "Gifhorn."

The data of a menu structure may be rendered with the aid of the image planes. In order to do this, the main menu is displayed on the image plane facing the viewer. After selection of a sub-menu point, the display changes to the next lower image plane to display the menu points that are then up for selection. In another display area in the next lower image plane, the previously displayed next higher image plane may then still be shown.

The image planes may be shown one behind the other. This may provide that the data of the image plane behind the one facing the viewer are able to be made visible by fading out, shifting or deleting image elements of the image plane facing the viewer. In the case of several image planes, in this manner, for example, a view of the data lying on the third image plane may be assured.

A display in three-dimensional form may be provided, since spatial relationships are able to be reflected. In the above-mentioned example of a display for a navigation application, the information regarding the traffic jam would be shown in the image plane that is spatially closest to the viewer, followed by the instruction on leaving the expressway. On the image plane farthest back spatially, the superordinated direction would be shown. A further relation may also be linked to the situation or the hierarchy of the operating elements in the vehicle. Of first priority, and therewith also display elements to be shown in the first image plane, may be the functions required for maneuvering the vehicle and appertaining data such as light, blinkers and shifting gears. On the next hierarchical plane one would then find the functions to be directly operated, such as important comfort and convenience functions or activating handsfree telephone equipment in response to an incoming call that is accepted. In the farthest back image plane and the lowest hierarchical step; less important vehicle condition data, such as the next service appointment, the detailed functions of the AUDIO and entertainment system or the navigation system may be situated.

The display device is at least part of an instrument cluster in a motor vehicle. This may provide that, besides the standard displays, such as speed, daily kilometer counter, etc., additional data, such as AUDIO and information data, navigation announcements, warning notices on the operating condition of the vehicle or even data concerning communications systems present in the vehicle may be able to be displayed in a single display module, and nevertheless clear and well structured.

The dynamically changing display elements may be shown together in one image plane. Since these image planes for the most part include important data for the driver, such as speed or clearance from the preceding vehicle, this image plane may be the image plane facing the viewer most closely.

The static display elements may also be shown in common in one image plane. These are, for instance, the date, the tuning to a radio station or CD's that have been selected. The image plane having the image elements that change dynamically may at least partially, and possibly even only in partial areas, fade out the image plane having the static image elements.

Example embodiments of the present invention are described in greater detail below with reference to the appended Figures.

DETAILED DESCRIPTION

Figure 1:
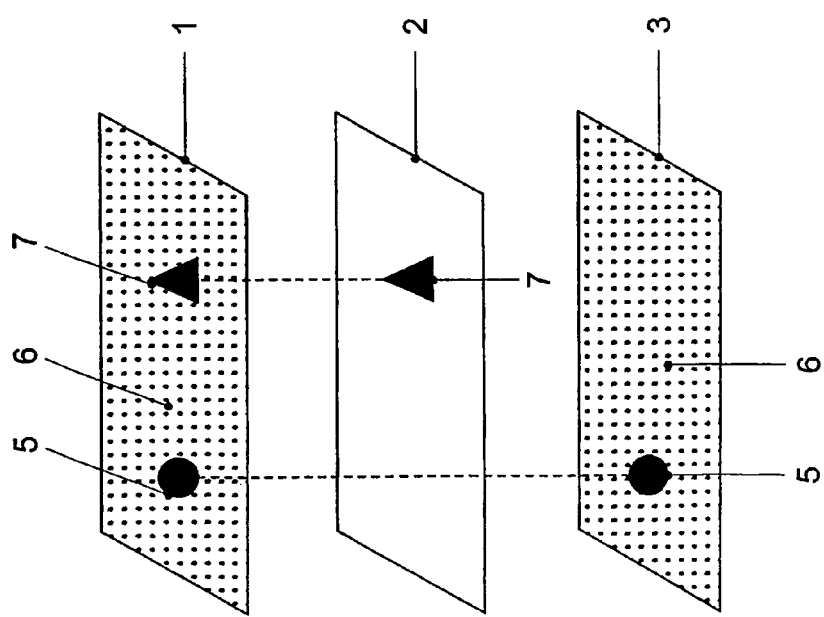
FIG. 1 schematically illustrates a display device from two image planes combined.

FIG. 1 illustrates the composition of an image 1 that is output or displayed on a display device, made up of a plurality of image planes 2, 3. Image 1 displayed is combined from image elements 5, 6, 7 of first image plane 2 and second image plane 3. In the first image plane, an object is positioned as an individual image element 7, while in the second image plane an object is shown as image element 5 and a background as image element 6. Image elements 5, 7 take up only a limited display area, while image element 6 extends over the entire display area, with the exception of the area on which image element 5 is shown. The area of first image plane 2, which is not already covered by an image element, is transparent, and thus allows the viewer a free view onto the image planes situated behind it.

In the example illustrated in FIG. 1, first image plane 2 has a higher priority assigned to it than second image plane 3. The result is that non-transparent image elements 7 of first image plane 2 cover image elements 6 of second image plane 3, which are located at the same place, and consequently, the covered image areas of the second image plane are not visible to the viewer. Thus, non-transparent image element 7 of first image plane 2, in its illustration area, covers the image elements on the image planes of lower priority, as, for instance, partial areas of image elements 6 on second image plane 3. If image element 7 of first image plane 2 is arranged to be partially light-transmitting, and if it therefore has only limited transparency, image element 6, which is located at the same image area of second image plane 3, is luminously perceptible, partially, through image element 7 of first image plane 2, in the image to be seen by the viewer.

If second image plane 3 has a higher priority assigned to it than first image plane 2, and large-image area image element 6 of second image plane 3 is transparent, and therefore opaque to image elements of image planes of lower priority, that are located at the same position, such as, for instance, object 7 in first plane 2, image element 7 in first image plane 2 is not be visible to the viewer.

If image elements 5, 6, 7 represent different data or announcements, then, in any case, those announcements may be visible to the viewer to which the highest priority is assigned. Data may in this case be, for instance, directional instructions of a navigation system, information on a music title that has just finished playing, current speed or others. Announcements in this case are, for example, a warning about a low oil level, an advisory about the clearance from an obstacle located behind the vehicle, or other announcements.

In order to grant the viewer an unrestricted view of image elements of highest priority 7, image plane 2, on which image elements 7 having highest priority are situated, is combined with image plane 3, on which image elements 5, 6 having comparatively low priority are shown, such that image elements 7, having the highest priority, are in every case visible to the viewer, and, if necessary, cover image elements 5, 6 of lower priority, which are situated on other image plane 3, which then at least partially are able to be invisible to the viewer. This may be done in that image planes 2, 3, depending on their priority rating, are situated one behind the other, without necessarily making use of a three-dimensional representation. An image construction from several image planes 2, 3 is suitable, however, for rendering a spatial positioning of image elements 5, 6, 7 shown. In this connection, on image plane 2, that lies closest to the viewer, image element 7, which from a perspective point of view lies closest to the viewer, is also shown, and in image plane 3, which lies further back, image elements 5, 6 are shown, which are also supposed to be situated further back for the viewer. A three-dimensional representation may also be supported or achieved by suitable optical elements.

If a display device in an instrument cluster of a motor vehicle is used, it may be provided to position the illustration of the objects for the AUDIO and entertainment applications in the image plane, having the lowest priority, since these image elements are usually of subordinate importance for travel safety. If background representation 6, which is transparent in areas in which image elements for showing infotainment-related data are shown, is combined with objects 5, that change statically, in image plane 3 having the next higher priority, and in image plane 2, having the highest priority, dynamically changing image elements 7 are shown, it may be provided that, in case of a disturbance, the image elements for showing infotainment-related data do not cover up more important image elements 5, 7, which are thus rating at higher priority.

In order to make possible the view onto all image elements, the viewer may be permitted to confirm his receipt of an announcement, and to shift object 7, which covers another image element 6, on the display surface or to situate it in another image plane 3 of lower priority, so that faded out image element 6 is then visible to the user, since image element 6, that is first covered, has a higher priority than image element 7 which is first covering image element 6.

This may occur in that image element 7, that is first covering image element 6, is ported over to an image plane, whose priority is lower than image plane 3, in which image element 6, that is first covered, is situated, or that image element 7, that first covered this image element 6, is assigned a lower priority than image element 6 that is first covered, and image elements 6, in a display area then having the highest priority, are always positioned in image plane 2 that is situated closest to the viewer.

Figure 2:
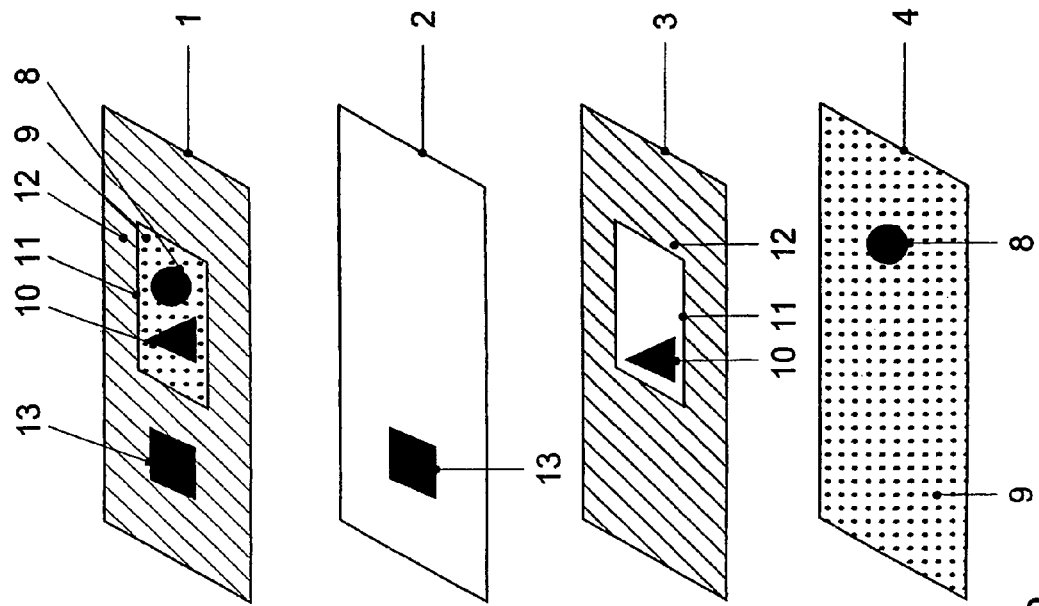
FIG. 2 schematically illustrates a display device from three image planes combined.

FIG. 2 shows the arrangement of an image 1 that is shown on a display device and is visible to a viewer, whose content is combined from image elements 8, 9, 10, 11, 12, 13 of a first image plane 2, a second image plane 3 and a third image plane 4. As illustrated, first image plane 2 is assigned the highest priority, second image plane 3 is assigned the middle priority and third image plane 4 is assigned the comparatively lowest priority. The image elements of third plane 4 are a small object 8, that takes up only a small part of the display area, and an object 9 that takes up the entire remainder of the display area, which may be designated as the background of the third image plane. On second image plane 3, three image elements are shown. An object 10, taking up only a small part of the display area, lies within an image element 11 which, with the exception of small object 10, is identified as transparent, and thereby, in this display area, unblocks the view onto the planes of lower priority, that is, third plane 4. The rest of the display area is covered by an image element 12, which may be designated as the background of second image plane 3. On first image plane 2, having the highest priority, a small image element 13 is shown, which covers only a partial area of the display area.

On image 1 that is visible to the viewer, shown in FIG. 2, all image elements 13 are to be seen, of first image plane 1 having the highest priority. Image elements 10, 11, 12 of second image plane 3 having the middle priority are visible to the viewer, provided they are not covered up by image elements of the first image plane having the higher priority. Thus, the viewer sees image element 13 of first image plane 2, object 12 that is shown as background of second image plane 3, image element 10 and the image elements of third image plane 4 that lie in the display area, of transparent image element 11, that is not covered up by image elements of first or second image plane 2, 3, that is, a partial area of object 9, representing the background of third image plane 4 and small image element 8 imaged in the third image plane. Background element 9 of third image plane 4, as well as background element 12 of second image plane 3 are thus partially covered by other objects of the planes having a higher priority in each case.

If other data or announcements are to be displayed for which there is no room in the instantaneous representation, additional display areas or display elements may be activated in order to display data there. For example, elements of subordinate priority are to be shown in the display areas or display modules that have been switched in, provided that the display areas or display elements are not situated in the central field of view of the viewer. It is also possible to have an additional display in the central field of view of the viewer, in order to summarize there the most important data or status messages, that is, those having the highest priority.

Figure 3:
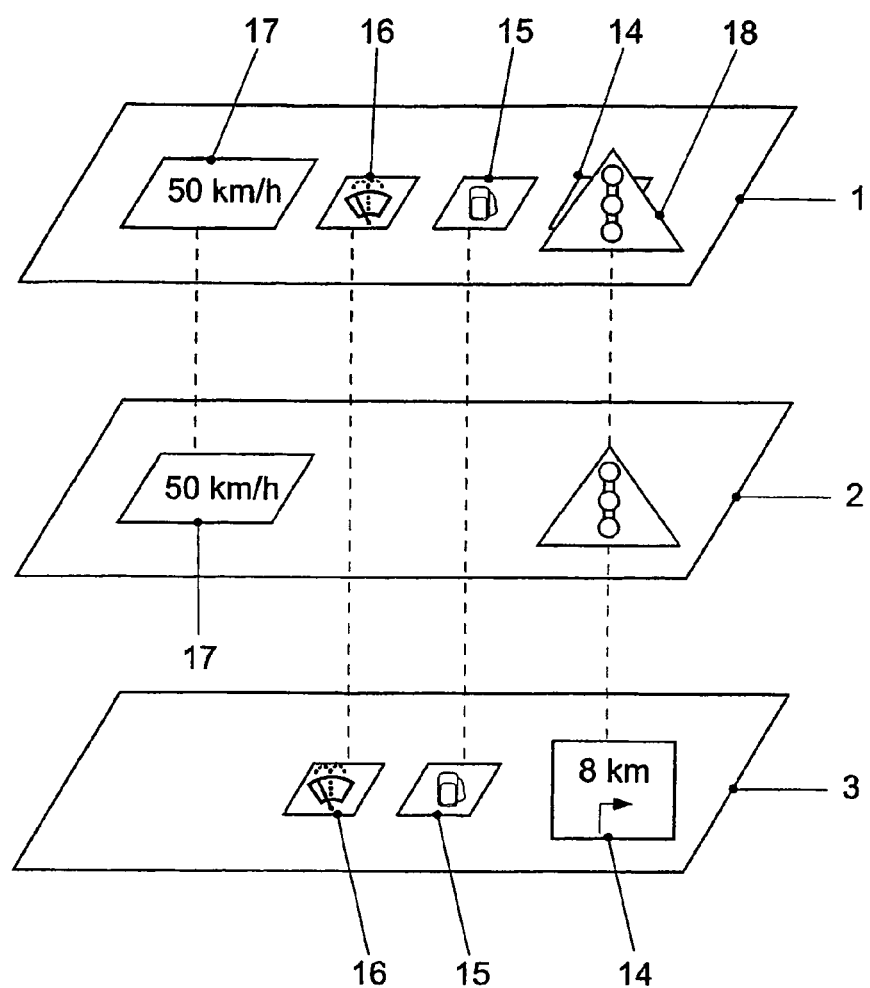
FIG. 3 schematically illustrates a display device having static and dynamic image elements from two image planes combined.

FIG. 3 shows the image construction of an image 1 that is output or displayed on a display device, and is combined from two image planes 2, 3. Displayed image 1 is made up of image elements 17, 18 of first image plane 2 and image objects 14, 15, 16 of second plane 3. The dynamic display elements, such as speed display 17, are situated in the first image plane having the higher priority, and static image objects 14, 15, 16, such as warning notices on low filling levels of operating substance tanks or the windshield wiper liquid, are shown on second image plane 3 having lower priority. This may provide that steadily updated display elements 17 are also steadily visible to the viewer, while image elements 14, 15, 16, on which the information content changes little over time, may, under certain circumstances, be covered up from time to time.

Furthermore, with the aid of image planes 2, 3, logically linked data may also be displayed, staggered according to their logical sequence. If the warning is about an approaching traffic jam at a distance of already 5 km, but the next turn-off crossing is only at a distance of 8 km, traffic jam warning 18 may be shown in the first image plane and the notice on change of direction 14 may be shown in second image plane 3. In this connection, it is also possible to partially or fully cover image elements 14, with their data lying farther behind in their logical sequence, by image elements 18 in exchange for their data lying further in front in their logical sequence. Moreover, the possibility may be offered also to show to the viewer image elements 14 that are possibly partially or entirely faded out, in that another priority is assigned to them, or in that the viewer shifts faded-out image elements 14 into another image area or to another image plane 2.

The arrangement of an image shown on a display device from several image planes 2, 3 also proves favorable for displaying a menu guidance. In order to provide that the current menu plane, in which the next input has to take place, is brought to display, it may be established that the display of this menu plane takes place by an image element in first image plane 2 having the highest assigned priority. The previously current menu plane may then have the next lower priority, and may at least still be partially visible if it were only partially covered by the presently current menu plane. Upon the next selection of a menu point, the objects already displayed, up to now, for a menu selection may be set back one step in their priority in each case. That is why it may happen that the objects for displaying the first selected menu points are completely or partially covered by the image elements for displaying the menu planes selected later. Another possibility comes about if the image elements that are already brought to display are shifted, for displaying a menu selection in the selection of a new menu point, to another display area or another image plane 3, or if the image object for displaying the menu point, that is newly selected, or the menu window are to be displayed in a different display area from that which is being used for the display of objects for displaying the previously selected menu points. The menu planes opened before may close if a last selection of a function or application is met, or if the procedure is broken off in another manner.

LIST OF REFERENCE NUMERALS 1 displayed image
2, 3, 4 image planes
5, 6, 7, 8, 9, 10, 11,
12, 13, 14, 15, 16, 17, 18 image elements

What is claimed is:

1. A display device for a vehicle, comprising:
at least one processor device adapted to generate at least two image planes including image elements and adapted to combine the image planes into at least one image; and
at least one display element adapted to display the image;
wherein data having different priorities are displayable on the image planes, the data of different priorities including announcements;
wherein each of a plurality of announcements are displayable at alternating time intervals in a same location of a same display area, the time intervals determined by the at least one processor device;
wherein additional image elements are displayed to indicate a presence of each of the plurality of announcements not currently displayed;
the at least one processor device further adapted to rate logically connected data according to a logical sequence as a function of the relevance of the logically connected data to operation of the vehicle, wherein the logically connected data are displayable staggered on various image planes according to the logical sequence; and
wherein the logically connected data displayable on one of the various image planes having a first priority is shiftable with the logically connected data displayable on another of the various image planes having a second priority lower than the first priority, such that the logical sequence is reassigned according to a new priority and the data is displayable in the reassigned logical sequence, and that the data displayable on the one of the various image planes is exchanged with the data displayable on the another one of the various image planes.

2. The display device according to claim 1, wherein the image planes include areas that appear transparent in at least one of (a) partial areas and (b) an entire area.

3. The display device according to claim 2, wherein the transparent areas appear at least one of (a) partially and (b) completely light-transmitting on the image planes.

4. The display device according to claim 1, wherein the display device is adapted to display primary and secondary information.

5. The display device according to claim 1, wherein data of different information content are displayable on the image planes.

6. The display device according to claim 1, wherein the image planes are displayable one after the other.

7. The display device according to claim 1, wherein at least one of (a) the announcements and (b) announcements of a high priority are displayable on the image plane closest to a viewer.

8. The display device according to claim 1, for a plurality of announcements, at least a part of the announcements, rated as to priority, is displayable in the image plane facing closest to a viewer.

9. The display device according to claim 1, wherein the logically connected data are displayable, rated as to logical sequence, on the image plane facing closest to a viewer.

10. The display device according to claim 1, wherein data of a menu plane of a menu structure is displayable on an image plane.

11. The display device according to claim 10, wherein data of a selected menu plane is displayable on the image plane closest to a viewer.

12. The display device according to claim 1, wherein three image planes are displayable one behind the other.

13. The display device according to claim 1, wherein the display device is at least a part of an instrument cluster of a motor vehicle.

14. The display device according to claim 1, wherein at least a part of the image elements displayed on the image planes is displayable in a three-dimensional manner.

15. The display device according to claim 1, wherein display elements that change dynamically are displayable in common on an image plane.

16. The display device according to claim 15, wherein the display elements that change dynamically are displayable in common on the image plane facing closest to a viewer.

17. The display device according to claim 1, wherein static display elements are displayable in common on an image plane.

18. The display device according to claim 17, wherein the image plane on which the static display elements are displayable is at least partially coverable by an image plane on which dynamically changing display elements are displayable.

19. A method for displaying data on a display device for a vehicle, comprising:
  generating, by a processor device, at least two image planes having image elements;
  combining the image planes for displaying at least one image;
  displaying the image on at least one display element; and
  rating logically connected data according to a logical sequence as a function of the relevance of the logically connected data to operation of the vehicle, wherein the logically connected data are displayable staggered on various image planes according to the logical sequence;
  wherein the displaying includes displaying, on various image planes, at least partial data of different priority, the at least partial data of different priority including announcements;
  wherein the displaying includes displaying each of a plurality of announcements at alternating time intervals in a same location of a same display area, the time intervals determined by the processor device;
  wherein additional image elements are displayed to indicate a presence of each of the plurality of announcements not currently displayed; and
  wherein the logically connected data displayable on one of the various image planes having a first priority is shiftable with the logically connected data displayable on another of the various image planes having a second priority lower than the first priority, such that the logical sequence is reassigned according to a new priority and the data is displayable in the reassigned logical sequence, and that the data displayable on the one of the various image planes is exchanged with the data displayable on the another one of the various image planes.

20. The method according to claim 19, wherein the image planes include areas that appear transparent in at least one of (a) partial areas and (b) over an entire area.

21. The method according to claim 20, wherein the transparent areas appear at least one of (a) partially and (b) completely light-transmitting on the image planes.

22. The method according to claim 19, further comprising displaying primary and secondary information on the display device.

23. The method according to claim 19, wherein the displaying includes displaying different information content on various image planes.

24. The method according to claim 19, wherein the displaying includes showing the image planes one behind the other.

25. The method according to claim 19, wherein the displaying includes displaying at least one of (a) the announcements and (b) announcement of a high priority on the image plane closest to a viewer.

26. The method according to claim 19, wherein the displaying includes, for a plurality of announcements, displaying a part of the announcements, rated as to priority, in the image plane facing closest to a viewer.

27. The method according to claim 19, wherein the displaying includes displaying the logically connected data, rated as to logical sequence, on the image plane facing closest to a viewer.

28. The method according to claim 19, wherein the displaying includes displaying data of a menu plane of a menu structure on an image plane.

29. The method according to claim 28, wherein the displaying includes displaying data of a selected menu plane on the image plane closest to a viewer.

30. The method according to claim 19, wherein the displaying includes showing three image planes one behind the other.

31. The method according to claim 19, wherein the display device is at least a part of an instrument cluster of a motor vehicle.

32. The method according to claim 19, wherein the displaying includes showing the image elements on the image planes in a three-dimensional manner.

33. The method according to claim 19, wherein the displaying includes displaying dynamically changing display elements in common on an image plane.

34. The method according to claim 33, wherein the displaying includes displaying display elements that change dynamically in common on the image plane facing closest to a viewer.

35. The method according to claim 19, wherein the displaying includes displaying static display elements in common on an image plane.

36. The method according to claim 35, wherein the image plane on which the static display elements are displayed is at least partially covered by an image plane on which dynamically changing display elements are displayed.

* * * * *